(12) United States Patent
Yamamoto et al.

(10) Patent No.: US 11,014,406 B2
(45) Date of Patent: May 25, 2021

(54) TIRE

(71) Applicant: Sumitomo Rubber Industries, Ltd., Hyogo (JP)

(72) Inventors: Tetsuya Yamamoto, Kobe (JP); Takashi Okada, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 322 days.

(21) Appl. No.: 16/358,742

(22) Filed: Mar. 20, 2019

(65) Prior Publication Data

US 2019/0315160 A1    Oct. 17, 2019

(30) Foreign Application Priority Data

Apr. 16, 2018 (JP) .............................. JP2018-078601

(51) Int. Cl.
*B60C 3/04* (2006.01)
*B60C 11/00* (2006.01)
*B60C 11/01* (2006.01)

(52) U.S. Cl.
CPC ............ *B60C 3/04* (2013.01); *B60C 11/0083* (2013.01); *B60C 11/01* (2013.01)

(58) Field of Classification Search
CPC .............................. B60C 11/0083; B60C 3/04
See application file for complete search history.

(56) References Cited

U.S. PATENT DOCUMENTS

| | | | |
|---|---|---|---|
| 6,073,668 A * | 6/2000 | Iwasaki | B60C 11/00 152/209.14 |
| 2005/0061410 A1 | 3/2005 | Meyer et al. | |
| 2007/0131330 A1 * | 6/2007 | Yamashita | B60C 17/0027 152/517 |
| 2016/0052342 A1 * | 2/2016 | Ueda | B60C 5/12 152/454 |

(Continued)

FOREIGN PATENT DOCUMENTS

| | | |
|---|---|---|
| EP | 0 850 788 A1 | 7/1998 |
| EP | 1 086 832 A2 | 3/2001 |

(Continued)

OTHER PUBLICATIONS

Machine Translation: JP-2012096656-A, Niizawa, Tatsuro, (Year: 2021).*

(Continued)

*Primary Examiner* — Kendra Ly
(74) *Attorney, Agent, or Firm* — Studebaker & Brackett PC

(57) ABSTRACT

A tire comprises a tread portion provided with a tread profile. The axial distance $L_3$ from the tire equator to a contact point $P_3$ between the tread profile and a tangential line thereto at which the angle $\theta$ of the tangential line becomes 3 degrees with respect to the tire-axial-direction line, is smaller than 65% of a half tread width Tw. The difference $(\theta_{90}-\theta_{60})$ of an angle $\theta_{90}$ of the tangential line at an axial position $P_{90}$ apart from the tire equator by 90% of the half tread width Tw, from an angle $\theta_{60}$ of the tangential (Continued)

line at an axial position $P_{60}$ apart from the tire equator by 60% of the half tread width Tw, is in a range from 7 to 12 degrees.

8 Claims, 9 Drawing Sheets

(56) References Cited

U.S. PATENT DOCUMENTS

2017/0057302 A1\* 3/2017 Makino ............... B60C 17/0009

FOREIGN PATENT DOCUMENTS

| EP | 1 086 832 A3 | 1/2003 | |
|---|---|---|---|
| EP | 1 666 277 A1 | 6/2006 | |
| EP | 2 990 225 A1 | 3/2016 | |
| EP | 3 424 751 A1 | 1/2019 | |
| JP | 2012096656 A \* | 5/2012 | ......... B60C 11/0083 |
| JP | 2016-041563 A | 3/2016 | |
| JP | 2017-159810 A | 9/2017 | |

OTHER PUBLICATIONS

The extended European search report issued by the European Patent Office dated Aug. 12, 2019, which corresponds to European Patent Application No. 19162129.1-1012 and is related to U.S. Appl. No. 16/358,742.

\* cited by examiner

TIRE

TECHNICAL FIELD

The present invention relates to a tire of which tread portion has an improved tread profile.

BACKGROUND ART

Vehicle tires are required to exhibit high steering stability (including grip) and high wear resistance.

In order to improve various tire performances including steering stability and wear resistance, approaches have been made from a tread profile, namely, a profile of the tread surface of the tread portion of a tire in the tire meridian cross section.

For example, Japanese patent application publication No. 2017-159810 (Patent Document 1) discloses that the tire has a CTT profile which is a tread profile based on an involute curve.

Japanese patent application publication No. 2016-041563 (Patent Document 2) discloses that the tire has a MRT profile, namely, multi-radius tread profile.

SUMMARY OF THE INVENTION

Problems to be Solved by the Invention

Based on such background, the inventors of the present invention made a study on the change in the ground contacting shape of a pneumatic tire caused by a change in the tire load.

With respect to a pneumatic tire having a conventional tread profile (a) shown in FIG. 9 which is typical of the CTT profile, FIG. 7A shows the ground contacting shape Fa1 of the tire when a tire load of 20% of the maximum load capacity was applied, and the ground contacting shape Fat of the tire when a tire load of 100% of the maximum load capacity was applied. Further, FIGS. 8A and 8B show the change in the ground contacting length Ly and the change in the ground contacting width Lx of the tire when the tire load was changed.

With respect to a pneumatic tire having a conventional tread profile (b) shown in FIG. 9 which is typical of the MRT profile disclosed in Patent Document 2, FIG. 7B shows the ground contacting shape Fb1 of the tire when a tire load of 20% of the maximum load capacity was applied, and the ground contacting shape Fb2 of the tire when a tire load of 100% of the maximum load capacity was applied.

Further, in FIGS. 8A and 8B, there are shown the change in the ground contacting length Ly and the change in the ground contacting width Lx of the tire when the tire load was changed.

According to Patent Document 2, the axial distance from the tire equator to a position where the angle of a tangent to the tread profile (b) becomes 3 degrees is set to be smaller than 65% of a half tread width.

In such a tire, the axial position at which the ground contacting patch of the tire may have the longest ground contacting length in the tire circumferential direction, approaches to the tire equator. As a result, the load on the tread shoulder portions is relatively reduced, and the durability may be improved.

Further, in the case of the tread profile (b), the gradient of the increase in the ground contacting length Ly and the gradient of the increase in the ground contacting width Lx are substantially constant as shown in FIGS. 8A and 8B.

Therefore, there is an advantage that the ground contact pressure on the tread edge sides can be reduced and the shoulder wear can be reduced.

In the case of the tread profile (b), however, when the tire load is high, the ground contacting area becomes insufficient, and the steering stability including grip performance tend to be lowered.

As a result of the study made by the present inventors, it was found that, although it is possible to increase the ground contacting area by increasing the radius of curvature in a central part of the tread profile (b), the gradient of the increase in the ground contacting width Lx is decreased on the high tire load side, which causes a problem such that the effect of reducing the shoulder wear can not be exhibited.

It is therefore, an object of the present invention to provide a tire in which the wear resistance is improved, without sacrificing the steering stability including grip performance.

According to the present invention, a tire comprises:

a tread portion provided with a tread profile such that, in a meridian section of the tire under its standard state in which the tire is mounted on a standard wheel rim and inflated to a pressure of 30 kPa and no tire load is applied thereto, an axial distance $L_3$ from the tire equator to a contact point $P_3$ between the tread profile and a tangential line thereto at which the angle $\theta$ of the tangential line becomes 3 degrees with respect to the tire-axial-direction line, is smaller than 65% of a half tread width Tw, and the difference $(\theta_{90}-\theta_{60})$ between an angle $\theta_{60}$ with respect to the tire-axial-direction line, of the tangential line at an axial position $P_{60}$ apart from the tire equator by 60% of the half tread width Tw, and an angle $\theta_{90}$ with respect to the tire-axial-direction line, of the tangential line at an axial position $P_{90}$ apart from the tire equator by 90% of the half tread width Tw is in a range from 7 to 12 degrees.

In the tire according to the present invention, the axial distance $L_3$ and the difference $(\theta_{90}-\theta_{60})$ are specifically limited as described above. Therefore, owing to these synergistic effects, even when the radius of curvature Rc of the central part is set to be as large as, for example, 700 mm or more, the gradient of the increase of the ground contacting length Ly and the gradient of the increase of the ground contacting width Lx, both due to the increase of the tire load, can be kept almost constant.

Thus, it is possible to increase the ground contacting area to improve the steering stability including the road grip property, and at the same time, it is possible to reduce the ground pressure on the tread edge sides to reduce the shoulder wear so as to improve the wear resistance.

In the tire according to the present invention, it is preferable that a central part of the tread profile including the tire equator is formed by a circular arc having a radius of curvature Rc of not less than 700 mm.

In the tire according to the present invention, it is preferable that the tread portion is provided with at least two main grooves including two crown main grooves disposed on both respective sides of the tire equator, the ratio (Wc/ΣWg) between the width we of a center land portion defined between the two crown main grooves, and the sum ΣWg of the widths Wg of the two crown main grooves is in a range from 0.50 to 1.60, and the sum (Wc+ΣWg) of the center land portion width we and the total crown main groove width ΣWg is not more than 50% of the half tread width Tw.

In the tire according to the present invention, it is preferable that a pair of shoulder parts of the tread profile on both respective sides of the central part is formed by a circular arc having a radius of curvature Rs of from 10% to 30% of the radius of curvature Rc of the central part, the axially inner edge of each of the shoulder parts is located at a distance psi of not less than 50% of the half tread width Tw from the tire equator, and the axially outer edge of each of the shoulder parts is located at a distance iso of not more than 95% of the half tread width Tw from the tire equator.

In general, the shape (profile) of the tire under the standard state becomes similar to that of the raw tire in the vulcanization mold, therefore, the shape (including the tread profile) of the tire under the standard state can be controlled by defining the shape of the cavity of the vulcanization mold in which the raw tire is placed.

In this application including specification and claims, various dimensions, positions and the like of the tire refer to those under the standard state of the tire unless otherwise noted.

The above-mentioned standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

DESCRIPTION OF THE PREFERRED EMBODIMENTS

Embodiments of the present invention will now be described in detail in conjunction with accompanying drawings.

Figure 1:
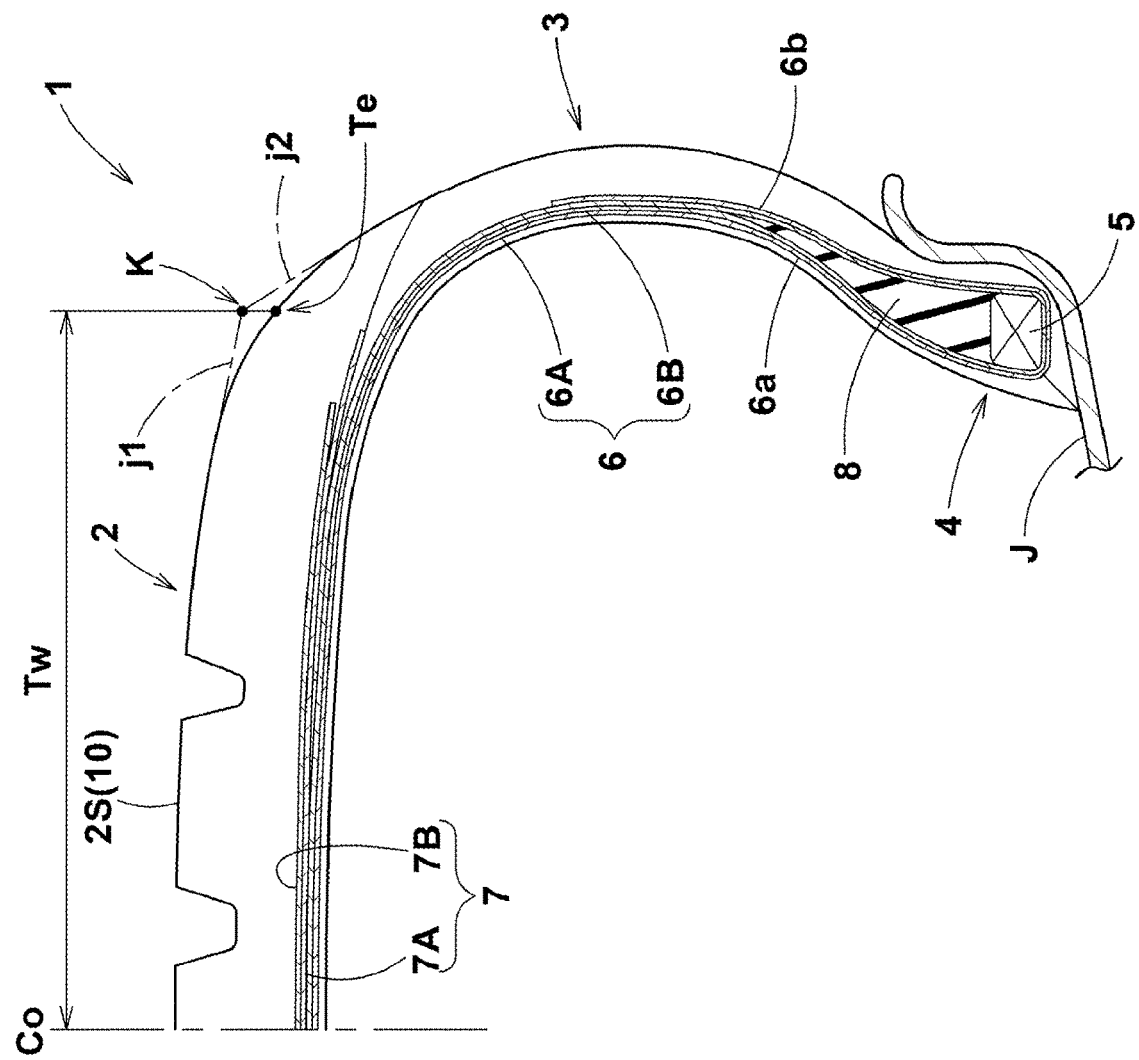
FIG. 1 is a cross sectional partial view of a tire as an embodiment of the present invention.

FIG. 1 shows a tire 1 as an embodiment of the present invention which is a pneumatic tire, for example, for a passenger car.

The tire 1 comprises a tread portion 2, a pair of bead portions each with a bead core 5 therein, a pair of sidewall portions 3 extending therebetween, a carcass 6 extending between the bead portions 4 through the tread portion 2 and sidewall portions 3, and a belt 7 disposed radially outside the carcass in the tread portion 2.

The carcass 6 is composed of one or more, in this example, two carcass plies 6A and 6B of carcass cords arranged at an angle of from 70 to 90 degrees with respect to the tire circumferential direction. Each carcass ply 6A, 6B extends between the bead portions through the tread portion and sidewall portions and is turned up around the bead core 5 in each bead portion so as to form a pair of turned-up portions 6b and a main portion 6a therebetween.

Between the turned-up portion 6b and the main portion 6a, there is disposed a rubber bead apex 8 extending radially outwardly from the bead core 5 to reinforce the bead portion.

The belt 7 is composed of two or more, in this example, two belt plies 7A and 7B made of belt cords arranged at an angle of from 10 to 40 degrees with respect to the tire circumferential direction so that the belt cords of the belt ply 7A intersect the belt cords of the belt ply 7B so as to increases the belt rigidity and strongly reinforces the tread portion 2.

Depending on requirements, a band (not shown) can be provided on the radially outside of the belt 7. The band is composed of a band ply formed by spirally winding a band cord. The band restrains the movement of the belt 7 by its hoop effect and can improve high speed running performance including high speed durability.

Figure 2:
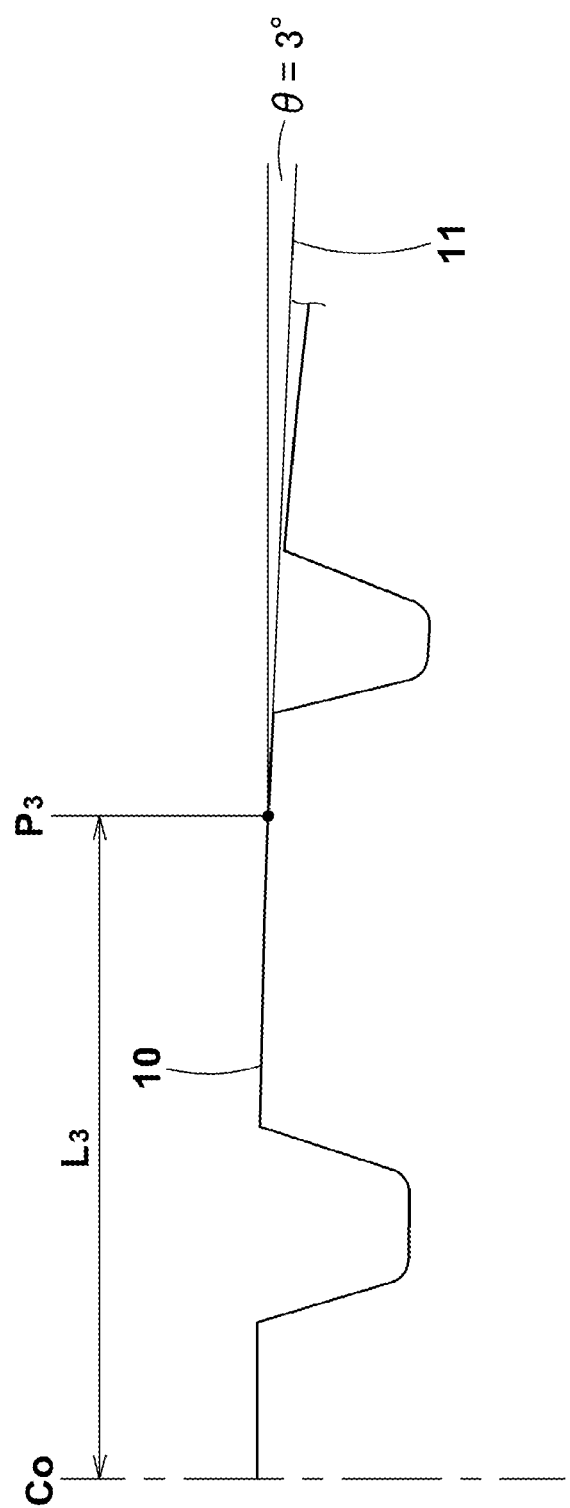
FIG. 2 is a diagram for explaining the distance of the contact point where the angle θ of the tangent to the tread profile becomes 3 degrees.

According to the present invention, the tread surface 2s of the tread portion 2 is provided with a tread profile 10 such that:

in a meridian section of the tire 1 under its standard state in which the tire 1 is mounted on a standard wheel rim J and inflated to a tire pressure of 30 kPa and no tire load is applied to the tire, the axial distance $L_3$ from the tire equator co to a position $P_3$ at which the angle θ of a tangent 11 to the tread profile 10 becomes 3 degrees with respect to the tire-axial-direction line as shown in FIG. 2, is set to be smaller than 65% of a half tread width Tw.

Figure 4:
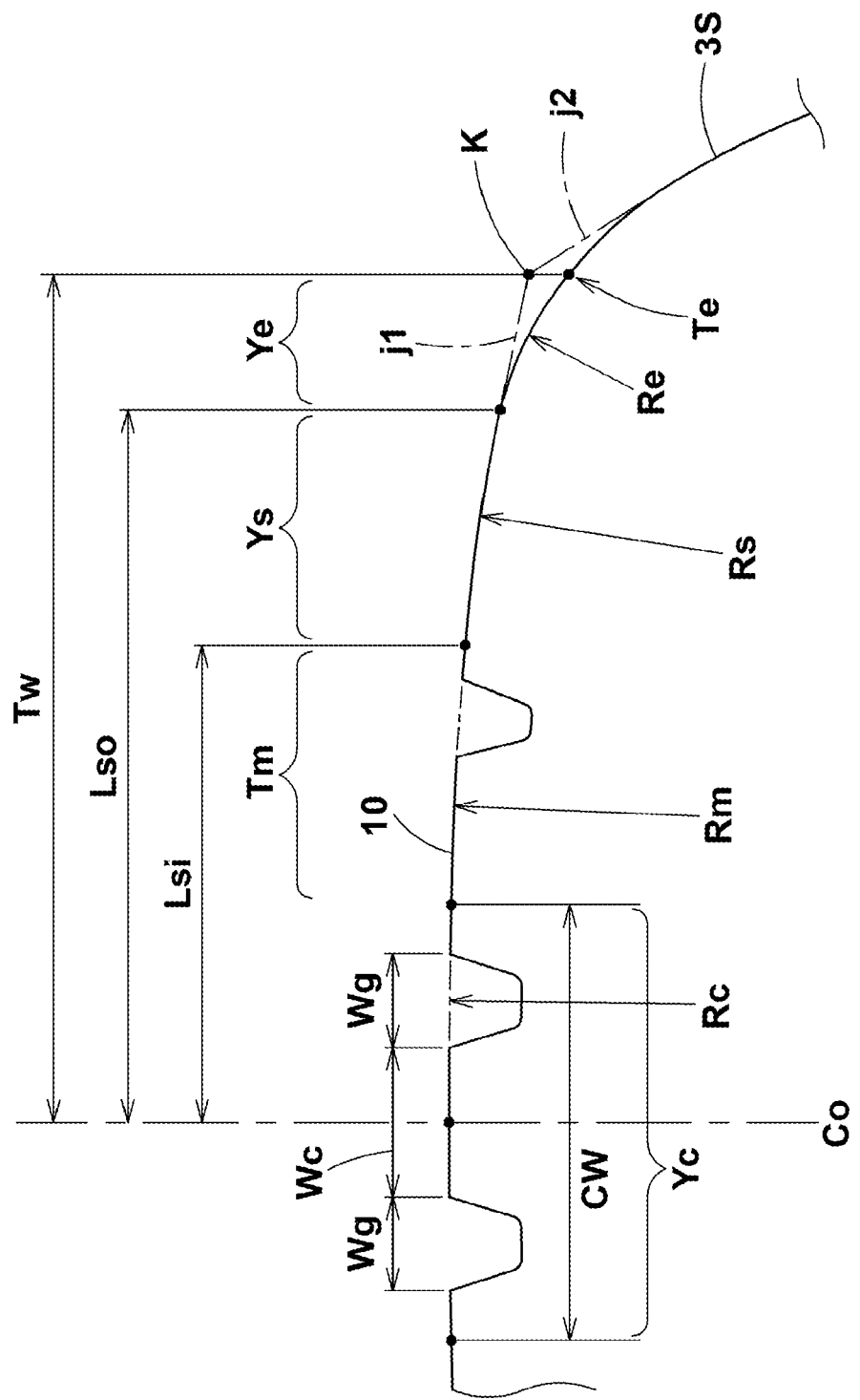
FIG. 4 is a diagram for explaining the central part and shoulder parts of the tread profile.

The half tread width Tw is, as shown in FIG. 1, the axial distance from the tire equator co to the tread edge Te. In the above-said meridian section, the tread edge Te is the intersecting point between the tread profile 10 and a radial line passing through an intersection K between an extension line j1 of the tread surface 2s (strictly speaking, as shown in FIG. 4, an extension line j1 of the arc forming the shoulder part Ys) and an extension line j2 of a sidewall surface 3s.

Figure 8A:
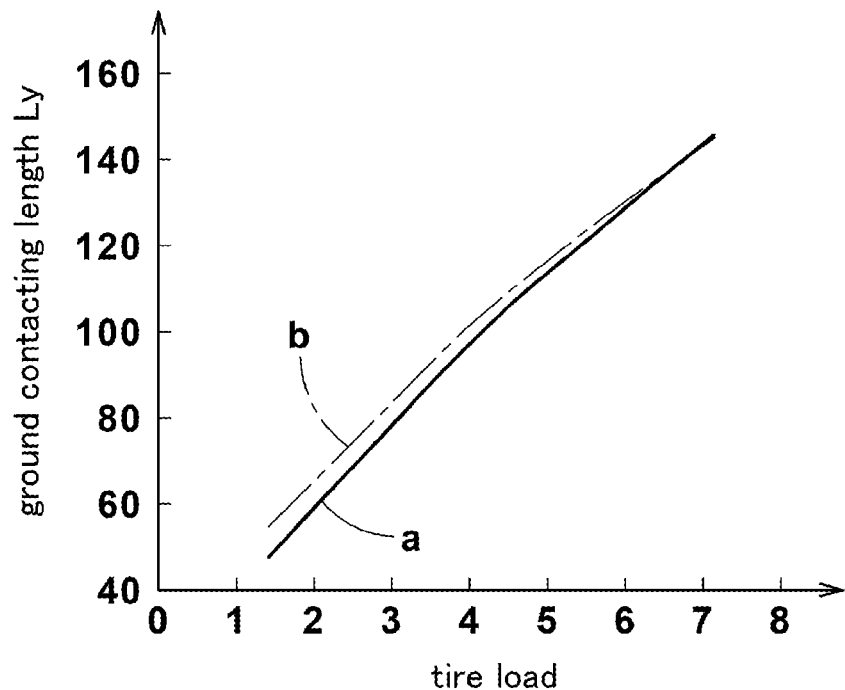
FIG. 8A is a graph showing changes in the ground contacting length Ly and the ground contacting width Lx of the tread portion with the tread profile (a) when the tire load is changed.
Figure 8B:
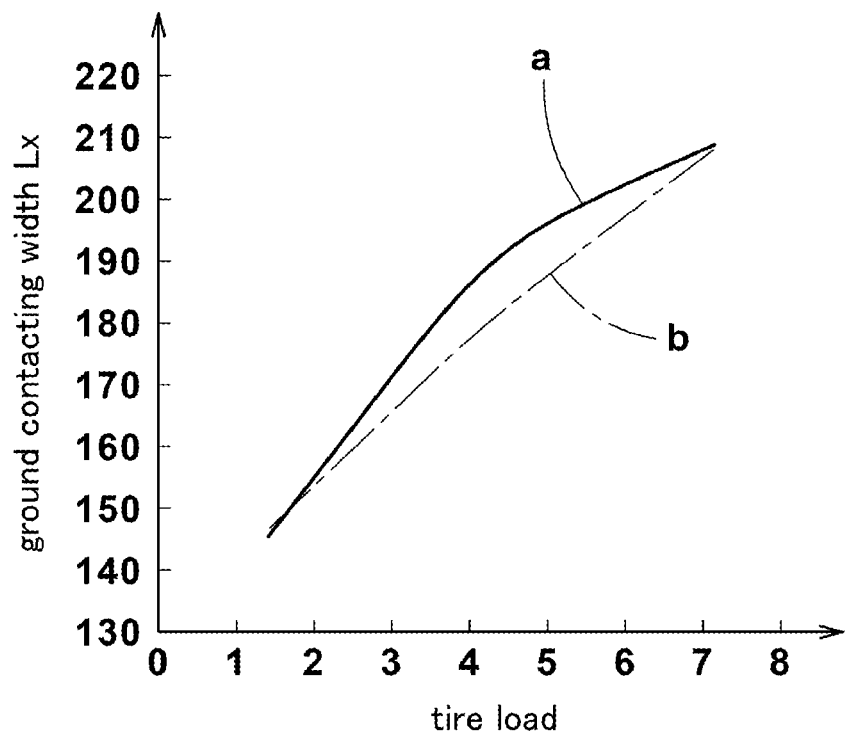
FIG. 8B is a graph showing changes in the ground contacting length Ly and the ground contacting width Lx of the tread portion with the tread profile (b) when the tire load is changed.
Figure 9:
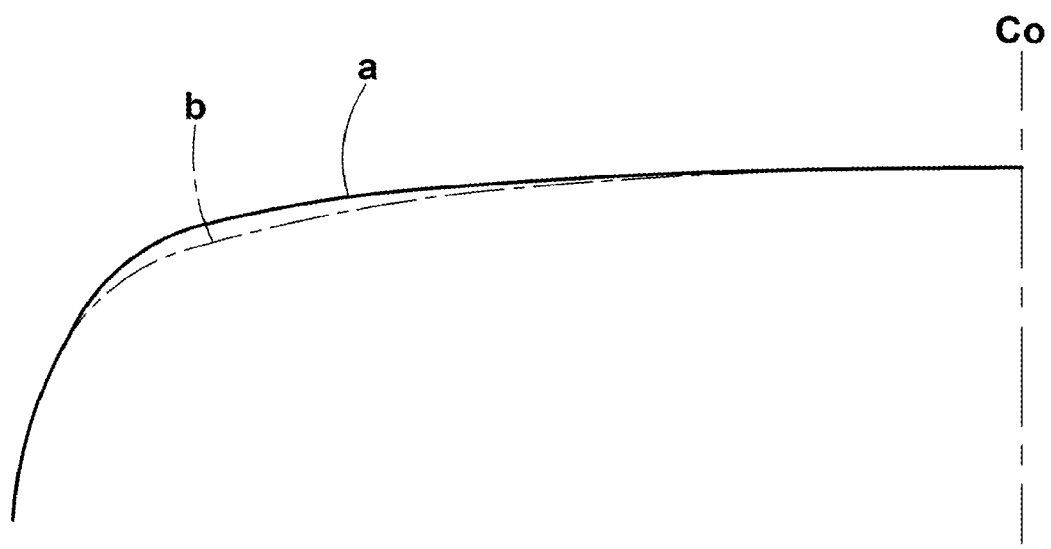
FIG. 9 is a diagram for explaining the tread profiles (a) and (b).

As a result of the study made by the present inventors, it was found that, as described in the section of the background art, in the case of the tire 1 in which the distance $L_3$ is less than 65% of the a half tread width Tw, the change of the ground contacting shape when the tire load changes is relatively small. That is, as shown in FIGS. 8A and 8B, the gradient of the increase of the ground contacting length Ly and the gradient of the increase of the ground contacting width Lx due to the increase of the tire load are small.

Therefore, there is an advantage such that the ground contact pressure in the tread edge sides can be decreased, and the shoulder wear can be reduced.

The distance $L_3$ is preferably not more than 60%, and preferably not less than 30% of the half tread width Tw.

If only the measure to set the distance $L_3$ to a value not more than 65% of the half tread width Tw is taken, then the ground contacting area at heavy tire load becomes insufficient, and the steering stability including the road grip property is deteriorated. This insufficiency of the ground contacting area can be overcome by increasing the radius of curvature Rc of the central part Yc as described later.

In this case, however, the gradient of the increase of the ground contacting width Lx decreases on the heavy load side, and the effect of reducing the ground pressure on the tread edge sides can not be sufficiently exhibited.

Figure 3:
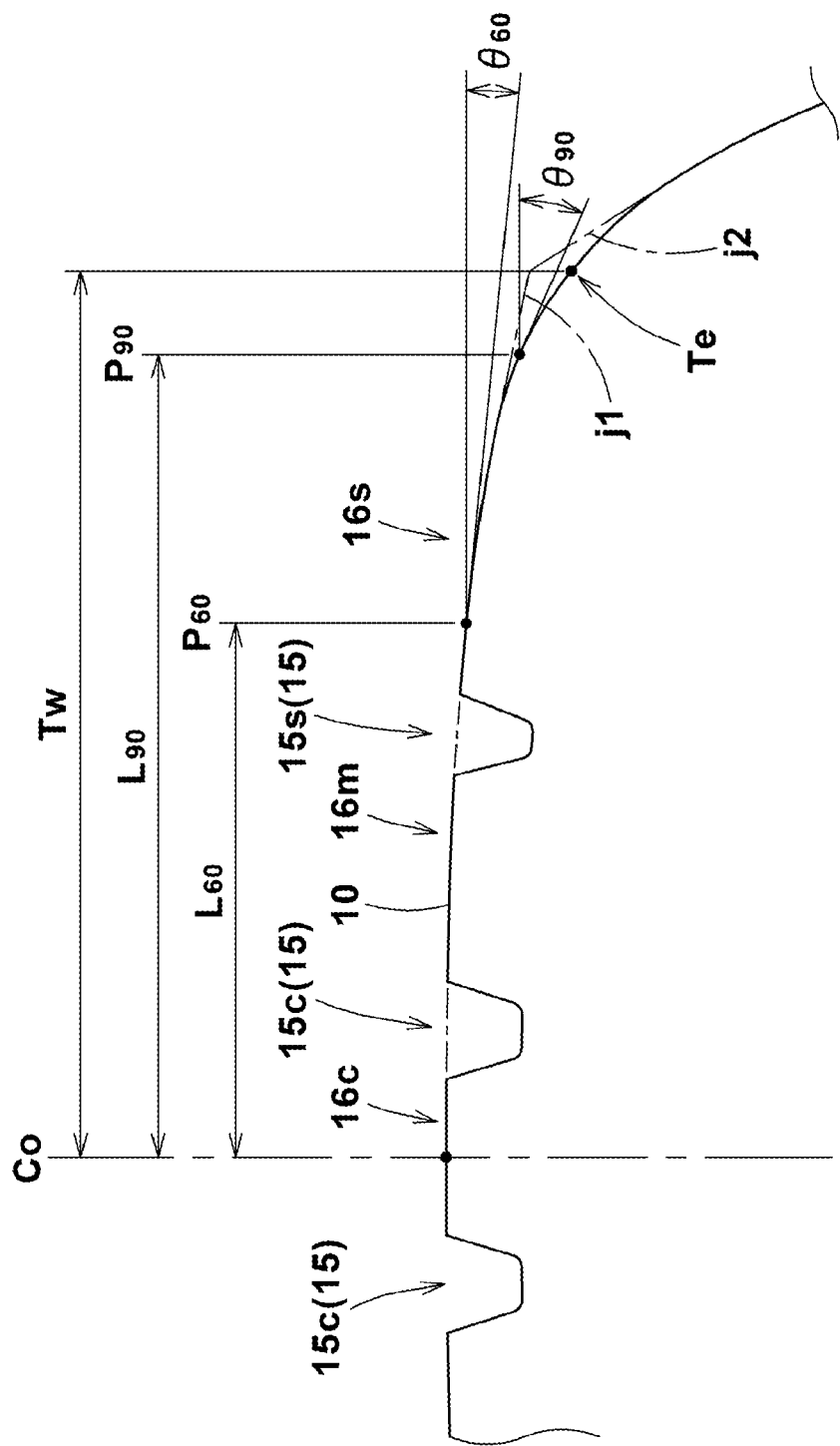
FIG. 3 is a diagram for explaining the positions $P_{60}$ and $P_{90}$ and the angles $\theta_{60}$ and $\theta_{90}$ of the tangent to the tread profile.

In the present invention, in order to resolve this problem, as shown in FIG. 3, the difference $(\theta_{90}-\theta_{60})$ between the angle $\theta_{60}$ of the tangent to the tread profile 10 at a position $P_{60}$ and the angle $\theta_{90}$ of the tangential to the tread profile 10 at a position $P_{90}$ is set in a range from 7 to 12 degrees.

The position $P_{60}$ is an axial position on the tread profile 10 spaced apart from the tire equator co by a distance $L_{60}$ of 60% of the half tread width Tw.

The position $P_{90}$ is an axial position on the tread profile 10 spaced apart from the tire equator co by a distance $L_{90}$ of 90% of the half tread width Tw.

The angles $\theta_{60}$ and $_{90}$ are angles measured with respect to the tire-axial-direction line in the above-said meridian section.

By the mutual effect of the setting the distance $L_3$ to a value not more than 65% of the Tw, and the setting the tangent angle difference $(\theta_{90}-\theta_{60})$ in the range from 7 to 12 degrees as described above, the radius of curvature Rc of the central part Yc is increased, and it becomes possible to make the gradient of the increase of the ground contacting length Ly and the gradient of the increase of the ground contacting width Lx almost constant even when the ground contacting area is increased. Thus, it becomes possible to improve the steering stability including the grip property by increasing the ground contacting area, and at the same time, it is also possible to reduce the ground contact pressure on the tread edge sides in order to improve the wear resistance.

In order to make the gradient of the ground contacting width Lx more constant, the difference $(\theta_{90}-\theta_{60})$ is preferably not less than 9 degrees and preferably not more than 11 degrees.

Figure 5:
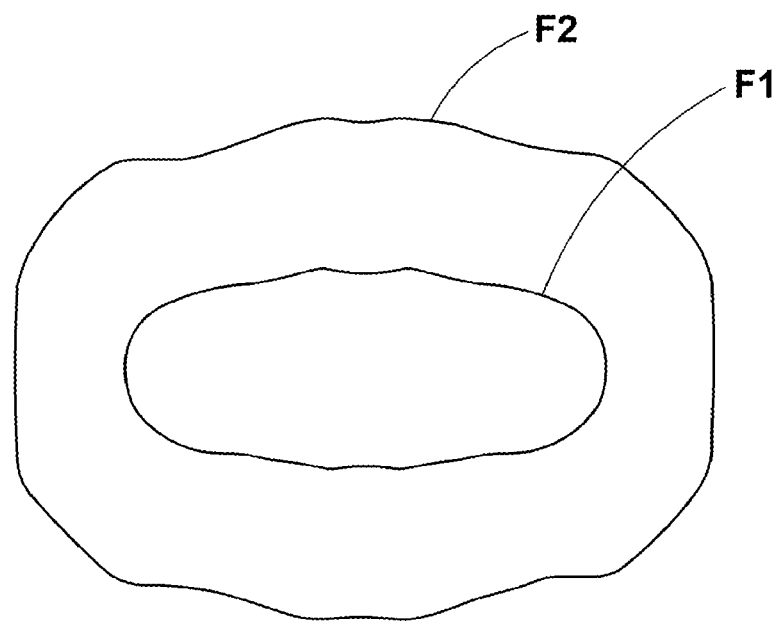
FIG. 5 is a diagram for explaining the change in the ground contacting shape of a tread portion with a tread profile according to the present invention when the tire load is changed.

FIG. 5 shows the ground contacting shape F1 of the tire when a tire load of 20% of the maximum load capacity is applied to the tire, and the ground contacting shape F2 of the tire when a tire load of 100% of the maximum load capacity is applied to the tire, wherein the radius of curvature Rc is 1200 mm.

Figure 6A:
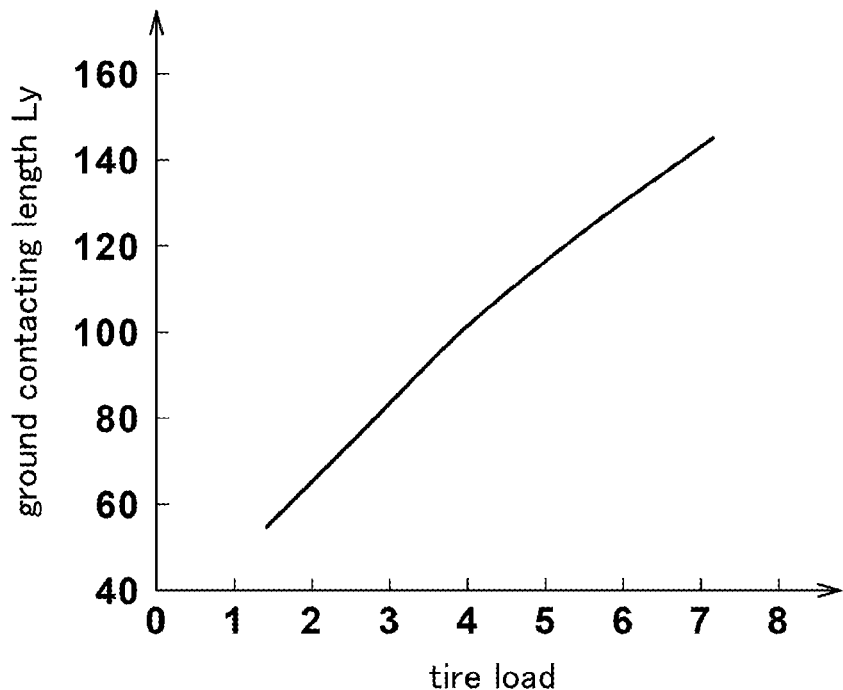
FIGS. 6A and 6B are graphs showing changes in the ground contacting length Ly and the ground contacting width Lx of the tread portion with the tread profile according to the present invention when the tire load is changed.
Figure 6B:
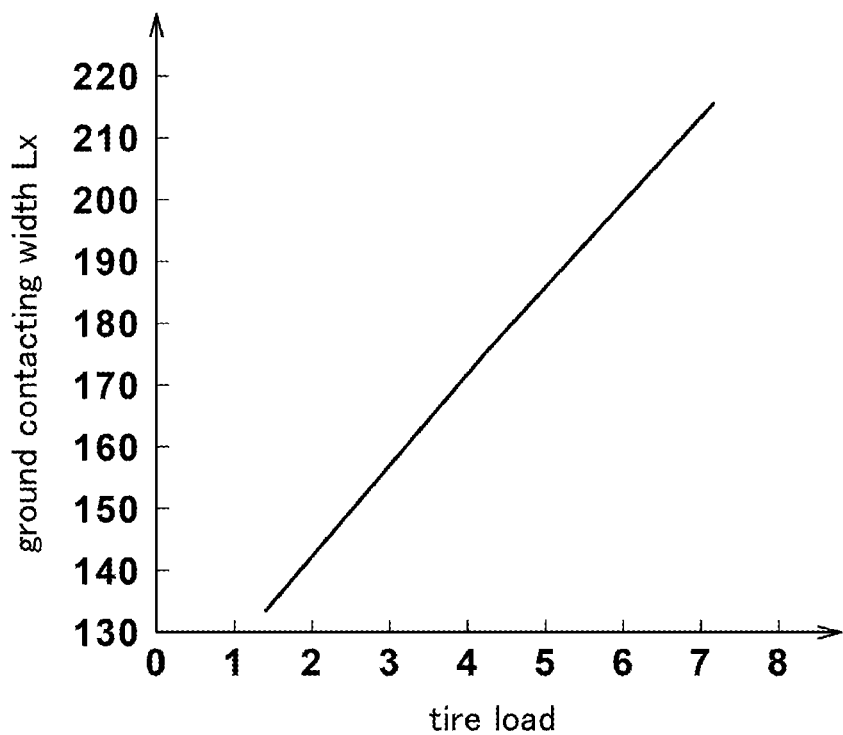
Figure 7A:
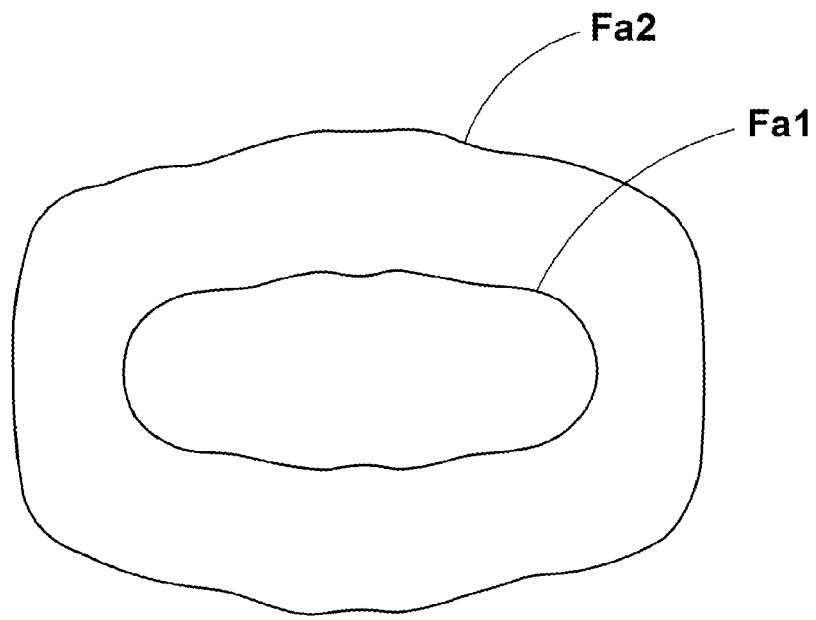
FIG. 7A is a diagram for explaining the change in the ground contacting shape of a tread portion with a tread profile (a) when the tire load is changed.
Figure 7B:
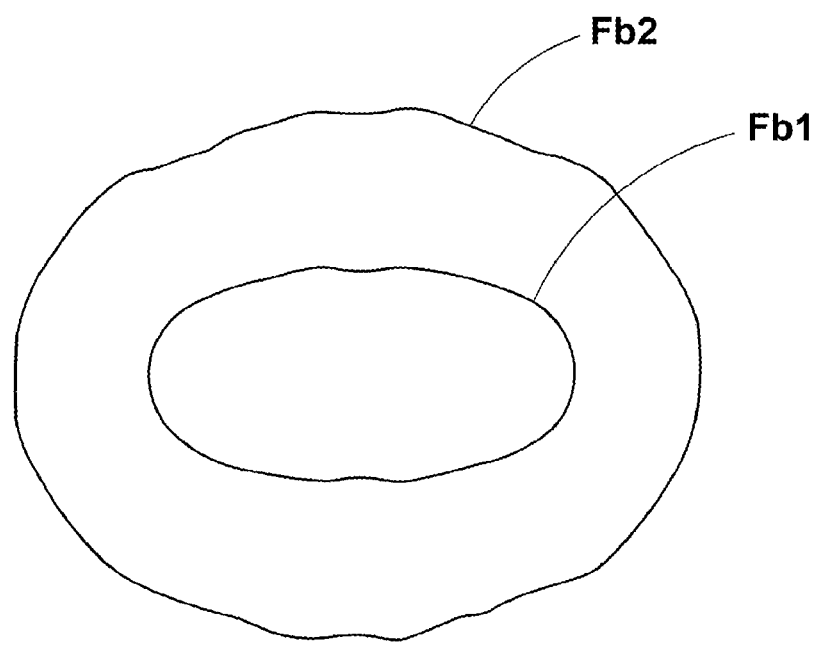
FIG. 7B is a diagram for explaining the change in the ground contacting shape of a tread portion with a tread profile (b) when the tire load is changed.

FIGS. 6A and 6B show changes in the ground contacting length Ly and the ground contacting width Lx when the tire load is increased.

When the angle difference $(\theta_{90}-\theta_{60})$ is in the range from 7 to 12 degrees, even if the radius of curvature Rc is made larger, the gradient of the increase in the ground contacting length Ly and the gradient of the increase in the ground contacting width Lx become substantially constant as shown in FIGS. 6A and 6B. Thereby, the ground pressure on the tread edge sides can be reduced.

As shown in FIG. 4, in order to increase the ground contacting area, the central part Yc of the tread profile 10 is formed by a circular arc having a radius of curvature Rc of not less than 700 mm, preferably not less than 1000 mm, more preferably not less than 1200 mm.

The central part Yc is defined as a part centered on the tire equator co and having a width Cw of 40% of the half tread width Tw. That is, on each side of the tire equator co, the central part Yc has a width of 20% of the half tread width Tw. When the radius of curvature Rc becomes larger, the ground contacting length of the central part Yc becomes longer, and as a result, the ground contacting area are also increased.

The tread profile 10 has a pair of shoulder parts Ys on both sides of the central part Tc.

The axially inner edge of each of the shoulder parts Ys is preferably located at an axial distance psi of not less than 50% of the half tread width Tw from the tire equator co, and the axially outer edge of each of the shoulder parts Ys is preferably located at an axial distance iso of not more than 95% of the half tread width Tw from the tire equator co.

The shoulder parts Ys are each formed by a circular arc having a radius of curvature Rs of from 10% to 30% of the radius of curvature Rc in the above-said meridian section.

If the ratio Rs/Rc of the radius of curvature Rs to the radius of curvature Rc exceeds 30%, the tread surface 2s becomes too flat. As a result, the uneven wear resistance tends to deteriorate. If the ratio Rs/Rc becomes less than 10%, the ground contacting length of the shoulder parts Ys becomes too short. As a result, the steering stability tends to deteriorate.

The tread profile 10 has a pair of middle parts Ym between the respective shoulder parts Ys and the central part Yc. Each of the middle parts Ym includes a part formed by a circular arc having a radius of curvature Rm, and optionally an axially inner part formed by a circular arc having the above-said radius of curvature Rc and connected to the central part Yc.

The radius of curvature Rm is preferably in a range from 35% to 65% of the radius of curvature Rc.

The tread profile 10 has a pair of outermost shoulder parts Ye located axially outside the respective shoulder parts Ys. The outermost shoulder parts Ye smoothly connect between the shoulder parts Ys and the sidewall surface 3s.

The tread edges Te occur in the outermost shoulder parts Ye. The outermost shoulder parts Ye is formed by a circular arc having a radius of curvature Re. The radius of curvature Re is preferably set in a range from 2.0% to 8.0% of the radius of curvature Rc.

The radii of curvature are Rc>Rm>Rs>Re, and the arcs are smoothly connected with each other without an inflexion point at each connecting position.

The tread portion 2 is provided with at least two main grooves 15 including two crown main grooves 15c disposed one on each side of the tire equator co. In this example, as shown in FIG. 3, the main grooves 15 further include two shoulder main grooves 15s disposed axially outside the respective crown main grooves 15c. Thereby, the tread portion 2 is axially divided into a center land portion 16c between the crown main grooves 15c, two middle land portions 16m between the crown main grooves 15c and the shoulder main grooves 15s, and two shoulder land portions 16s axially outside the shoulder main grooves 15s.

In this example, as shown in FIG. 4, in order to enhance the steering stability, the ratio (Wc/ΣWg) of the axial width Wc of the center land portion 16c to the sum ΣWg of the groove widths Wg of the two crown main grooves 15c is set in a range from 0.50 to 1.60. The ratio (Wc/ΣWg) is preferably not less than 0.60, but preferably not more than 1.40, more preferably not more than 1.20.

Further, the sum (Wc+ΣWg) of the axial width Wc of the center land portion 16c and the total width ΣWg of the two crown main grooves 15c is set to be not more than 50% of the half tread width Tw.

If the sum (Wc+ΣWg) becomes too large, the rigidity of the center land portion 16c increases and the steering stability deteriorates. If the groove width Wg is too wide for the land portion width Wc, the continuity of force from the center land portion 16c to the middle land portion 16b becomes worse, and the steering stability tends to deteriorate. If the groove width Wg is too narrow for the land portion width Wc, wet performance is deteriorated.

While detailed description has been made of an especially preferable embodiment of the present invention, the present invention can be embodied in various forms without being limited to the illustrated embodiment.

Comparison Tests

Pneumatic tires of size 235/65R16 115/113R (rim size 16×6.5J) having the internal structure shown in FIG. 1 and tread profiles having specifications shown in Table 1 were experimentally manufactured as test tires (practical examples Ex1-Ex7 and comparative examples Ref1-Ref4), and tested for the dry steering stability, wet steering stability and wear resistance.

(1) Dry Steering Stability Test

The test tires were mounted on all wheels of a test vehicle (Volkswagen crafter panel van). The test vehicle was ran on a dry road surface of a test course three laps (about 10 km per lap) under the following conditions.
tire pressure: front 340 kPa, rear 420 kPa
tire load: front 6.86 kN, rear 10.29 kN During running on a straight road at a speed of 140 km/h, lane changes were made ten times per lap, and the steering stability at that time was evaluated by the test driver.

The results are indicated in Table 1 by an index based on the comparative example Ref1 being 100, wherein the larger the numerical value, the better the dry steering stability.

(2) Wet Steering Stability Test

The above-mentioned test vehicle was ran on a wet road surface of a test course three laps (about 5 km per lap) under the following conditions.

tire pressure: front 300 kPa, rear 300 kPa
tire load: front 6.86 kN, rear 5.17 kN During running on a straight road at a speed of 50 km/h, lane changes were made five times per lap, and the steering stability at that time was evaluated by the test driver.

The results are indicated in Table 1 by an index based on the comparative example Ref1 being 100, wherein the larger the numerical value, the better the wet steering stability.

(3) Wear Resistance Test

The above-mentioned test vehicle was ran on a dry asphalt road surface of a wear testing course for 20,000 km, and then the amount δs of wear at positions of the shoulder main grooves and the amount δc of wear at positions of the crown main grooves were measured to obtain the ratio (δs/δc).

The obtained ratios (δs/δc) are indicated in Table 1 by an index based on the comparative example Ref1 being 100, wherein the larger the value, the better the wear resistance performance.

TABLE 1

| Tire | Ref1 | Ex1 | Ex2 | Ex3 | Ref2 | Ref3 |
|---|---|---|---|---|---|---|
| distance $L_3$ | 0.65 × Tw | 0.65 × Tw | 0.65 × Tw | 0.65 × Tw | 0.65 × Tw | 0.65 × Tw |
| difference ($\theta_{90} - \theta_{60}$) (deg) | 6 | 7 | 10 | 12 | 13 | 6 |
| curvature radius Rc (mm) | 1500 | 1500 | 1500 | 1500 | 1500 | 1000 |
| Rs/Rc (%) | 32 | 26 | 22 | 16 | 14 | 32 |
| Wc/ΣWg | 1 | 1 | 1 | 1 | 1 | 1 |
| (Wc + ΣWg)/Tw | 0.4 | 0.4 | 0.4 | 0.4 | 0.4 | 0.4 |
| dry steering stability | 100 | 103 | 105 | 103 | 100 | 95 |
| wet steering stability | 100 | 101 | 103 | 101 | 100 | 95 |
| wear resistance | 100 | 105 | 110 | 105 | 100 | 103 |

| Tire | Ex4 | Ex5 | Ref4 | Ex6 | Ex7 |
|---|---|---|---|---|---|
| distance $L_3$ | 0.65 × Tw | 0.65 × Tw | 0.68 × Tw | 0.65 × Tw | 0.65 × Tw |
| difference ($\theta_{90} - \theta_{60}$) (deg) | 10 | 10 | 10 | 10 | 10 |
| curvature radius Rc (mm) | 1000 | 1200 | 1500 | 1500 | 1500 |
| Rs/Rc (%) | 22 | 22 | 22 | 22 | 22 |
| Wc/ΣWg | 1 | 1 | 1 | 0.5 | 1.6 |
| (Wc + ΣWg)/Tw | 0.4 | 0.4 | 0.4 | 0.4 | 0.4 |
| dry steering stability | 100 | 103 | 100 | 100 | 101 |
| wet steering stability | 98 | 100 | 100 | 101 | 100 |
| wear resistance | 110 | 110 | 100 | 100 | 100 | half tread width Tw = 97.5 mm
tread profile consisting of arcs having radii Rc, Rm, Rs and Re As known from the comparison between the practical examples Ex1 to Ex3 and the comparative examples Ref1 and Ref2, it can be confirmed that, by limiting the difference ($\theta_{90}-\theta_{60}$) of the tangent angle within the specific range, even if the radius of curvature Rc of the central part is large, the uneven wear resistance can be improved, while ensuring excellent steering stability.

In the comparative example Ref3 and practical example Ex4, since the radius of curvature Rc was reduced to 1000 mm, the ground contacting area became smaller than that of the comparative example Ref1, and the steering stability was deteriorated. However, it can be confirmed that since the difference ($\theta_{90}-\theta_{60}$) was set in the specific range, the effect of improving the uneven wear resistance could be sufficiently exhibited.

As shown in the comparative example Ref4, when the distance $L_3$ exceed 0.65 times the tread half width Tw, it can be confirmed that even if the difference ($\theta_{90}-\theta_{60}$) was set in the specific range, the effect of improving the uneven wear resistance could not be sufficiently exhibited.

DESCRIPTION OF THE REFERENCE SIGNS 1 tire
2 tread portion
2s tread surface
10 tread profile
15c crown main groove
15 main groove
16c center land portion
Co tire equator
J standard wheel rim
Yc central part
Ys shoulder parts

The invention claimed is:

1. A tire comprising:
a tread portion provided with a tread profile such that,
in a meridian section of the tire under its standard state in which the tire is mounted on a standard wheel rim and inflated to a pressure of 30 kPa and no tire load is applied thereto,
an axial distance $L_3$ from the tire equator to a contact point $P_3$ between the tread profile and a tangential line thereto at which the angle $\theta$ of the tangential line becomes 3 degrees with respect to the tire-axial-direction line, is smaller than 65% of a half tread width Tw, and
the difference $(\theta_{90}-\theta_{60})$ between
an angle $\theta_{60}$ with respect to the tire-axial-direction line, of the tangential line at an axial position $P_{60}$ apart from the tire equator by 60% of the half tread width Tw, and
an angle $\theta_{90}$ with respect to the tire-axial-direction line, of the tangential line at an axial position $P_{90}$ apart from the tire equator by 90% of the half tread width Tw is in a range from 7 to 12 degrees.

2. The tire according to claim 1, wherein
a pair of shoulder parts of the tread profile on both respective sides of the central part is formed by a circular arc having a radius of curvature Rs of from 10% to 30% of the radius of curvature Rc of the central part,
the axially inner edge of each of the of shoulder parts is located at a distance Lsi of not less than 50% of the half tread width Tw from the tire equator, and
the axially outer edge of each of the of shoulder parts is located at a distance Lso of not more than 95% of the half tread width Tw from the tire equator.

3. The tire according to claim 1, wherein
the tread portion is provided with at least two main grooves including two crown main grooves disposed on both respective sides of the tire equator,
the ratio (Wc/ΣWg) between the width we of a center land portion defined between the two crown main grooves, and the sum ΣWg of the widths Wg of the two crown main grooves is in a range from 0.50 to 1.60, and
the sum (Wc+ΣWg) of the center land portion width we and the total crown main groove width ΣWg is not more than 50% of the half tread width Tw.

4. The tire according to claim 3, wherein
a pair of shoulder parts of the tread profile on both respective sides of the central part is formed by a circular arc having a radius of curvature Rs of from 10% to 30% of the radius of curvature Rc of the central part,
the axially inner edge of each of the of shoulder parts is located at a distance Lsi of not less than 50% of the half tread width Tw from the tire equator, and
the axially outer edge of each of the of shoulder parts is located at a distance Lso of not more than 95% of the half tread width Tw from the tire equator.

5. The tire according to claim 1, wherein
a central part of the tread profile including the tire equator is formed by a circular arc having a radius of curvature Rc of not less than 700 mm.

6. The tire according to claim 5, wherein
the tread portion is provided with at least two main grooves including two crown main grooves disposed on both respective sides of the tire equator,
the ratio (Wc/ΣWg) between the width we of a center land portion defined between the two crown main grooves, and the sum ΣWg of the widths Wg of the two crown main grooves is in a range from 0.50 to 1.60, and
the sum (Wc+ΣWg) of the center land portion width we and the total crown main groove width ΣWg is not more than 50% of the half tread width Tw.

7. The tire according to claim 6, wherein
a pair of shoulder parts of the tread profile on both respective sides of the central part is formed by a circular arc having a radius of curvature Rs of from 10% to 30% of the radius of curvature Rc of the central part,
the axially inner edge of each of the of shoulder parts is located at a distance Lsi of not less than 50% of the half tread width Tw from the tire equator, and
the axially outer edge of each of the of shoulder parts is located at a distance Lso of not more than 95% of the half tread width Tw from the tire equator.

8. The tire according to claim 5, wherein
a pair of shoulder parts of the tread profile on both respective sides of the central part is formed by a circular arc having a radius of curvature Rs of from 10% to 30% of the radius of curvature Rc of the central part,
the axially inner edge of each of the of shoulder parts is located at a distance Lsi of not less than 50% of the half tread width Tw from the tire equator, and
the axially outer edge of each of the of shoulder parts is located at a distance Lso of not more than 95% of the half tread width Tw from the tire equator.

* * * * *